(12) United States Patent
Fox et al.

(10) Patent No.: US 7,805,375 B2
(45) Date of Patent: Sep. 28, 2010

(54) DIGITAL LICENSE MIGRATION FROM FIRST PLATFORM TO SECOND PLATFORM

(75) Inventors: Christopher J. Fox, Woodinville, WA (US); Clifford P. Strom, Sammamish, WA (US); Matthew J. Bordenet, Sammamish, WA (US); Michael Y. Siu, Bellevue, WA (US); Stephen P. DiAcetis, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 11/316,509

(22) Filed: Dec. 21, 2005

(65) Prior Publication Data

US 2007/0043680 A1 Feb. 22, 2007

Related U.S. Application Data

(60) Provisional application No. 60/710,185, filed on Aug. 22, 2005.

(51) Int. Cl.
*G06F 21/00* (2006.01)
(52) U.S. Cl. .......................................... 705/59; 705/56
(58) Field of Classification Search ............. 705/50–51, 705/59, 56
See application file for complete search history.

(56) References Cited

U.S. PATENT DOCUMENTS

| | | | |
|---|---|---|---|
| 6,009,401 A | 12/1999 | Horstmann | 705/1 |
| 6,263,313 B1 * | 7/2001 | Milsted et al. | 705/50 |
| 6,393,127 B2 * | 5/2002 | Vogler | 380/283 |
| 6,735,691 B1 * | 5/2004 | Capps et al. | 713/1 |
| 6,772,340 B1 | 8/2004 | Peinado et al. | 713/168 |
| 6,775,655 B1 | 8/2004 | Peinado et al. | 705/59 |
| 6,944,300 B2 * | 9/2005 | Challener et al. | 380/277 |
| 6,999,947 B2 * | 2/2006 | Utsumi et al. | 705/59 |
| 7,174,368 B2 * | 2/2007 | Ross, Jr. | 709/207 |
| 7,178,027 B2 * | 2/2007 | Faigle | 713/169 |
| 7,337,332 B2 * | 2/2008 | Tsuria et al. | 713/193 |
| 7,340,055 B2 * | 3/2008 | Hori et al. | 380/201 |

(Continued)

FOREIGN PATENT DOCUMENTS

WO   WO 2006059178 A1 *  6/2006

OTHER PUBLICATIONS

DRM Specification V2.0 Candidate Version 2.0, Open Mobile Alliance OMA-DRM-DRM-V2_0-0041210-C, Dec. 10, 2004, 145 pages.*

(Continued)

*Primary Examiner*—Calvin L Hewitt, II
*Assistant Examiner*—James D Nigh
(74) *Attorney, Agent, or Firm*—Woodcock Washburn LLP

(57) ABSTRACT

A digital license is migrated from a source platform to a target platform. At the source platform, a migration image is produced to include the license and corresponding data therein, and the license is deleted from such source platform. At the target platform, permission is requested from a centralized migration service to migrate the license in the migration image to the target platform. The migration service determines whether to permit migration of the license based on predetermined migration policy. Upon receiving the requested permission as a response from the migration service, the migration image is applied to the target platform by un-tying the license from the source platform and re-tying the license to the target platform.

18 Claims, 6 Drawing Sheets

U.S. PATENT DOCUMENTS

| | | | |
|---|---|---|---|
| 2001/0032088 A1 | 10/2001 | Utsumi et al. | 705/1 |
| 2001/0055395 A1* | 12/2001 | Vogler | 380/273 |
| 2002/0013772 A1 | 1/2002 | Peinado | 705/51 |
| 2002/0143885 A1* | 10/2002 | Ross, Jr. | 709/207 |
| 2002/0165825 A1 | 11/2002 | Matsushima et al. | 705/51 |
| 2002/0184154 A1* | 12/2002 | Hori et al. | 705/50 |
| 2002/0196941 A1 | 12/2002 | Isaacson et al. | 380/231 |
| 2002/0196946 A1* | 12/2002 | Challener et al. | 380/279 |
| 2004/0030898 A1* | 2/2004 | Tsuria et al. | 713/171 |
| 2004/0098419 A1* | 5/2004 | Bantz et al. | 707/203 |
| 2004/0181490 A1 | 9/2004 | Gordon et al. | 705/59 |
| 2004/0196972 A1 | 10/2004 | Zhu et al. | 380/45 |
| 2005/0021948 A1 | 1/2005 | Kamperman | 713/165 |
| 2005/0027991 A1 | 2/2005 | DiFonzo | 713/185 |
| 2005/0044016 A1 | 2/2005 | Irwin et al. | 705/30 |
| 2005/0091491 A1 | 4/2005 | Lee et al. | 713/167 |
| 2006/0031164 A1* | 2/2006 | Kim | 705/51 |
| 2007/0226786 A1* | 9/2007 | Berger et al. | 726/9 |

OTHER PUBLICATIONS ("Secure Delivery of Conditional Access Applications to Mobile Receivers", Eimear Gallery and Allan Tomlinson, Mobile VCE Research Group, Information Security Group, Royal Holloway, University of London, Egham, Surrey, England, Mar. 6, 2005.*

Erickson, J.S., "Fair Use, DRM, and Trusted Computing", *Communications of the ACM*, Apr. 2003, 46(4), 34-39, http://delivery.acm.org.

"InterTrust Announces Partnership Agreement to Integrate Marimba's Castanet with InterTrusts's Digital Rights Management", 2005, BMC Software, http://www.marimba.com/news/releases/InterTrust.html, 2 pages.

* cited by examiner

DIGITAL LICENSE MIGRATION FROM FIRST PLATFORM TO SECOND PLATFORM

CROSS REFERENCE TO RELATED APPLICATION

This application claims the benefit of U.S. Provisional Application No. 60/710,185, filed Aug. 22, 2005 and entitled "DRM LICENSE MIGRATION PROCESS FOR PROTECTED CONTENT", hereby incorporated by reference in its entirety.

TECHNICAL FIELD

The present invention relates to a method and service for migrating a digital license from a first computing platform to a second computing platform. More particularly, the invention relates to such a method and service for un-tying the license from the first platform and re-tying the license to the second platform, and for ensuring that the license cannot be employed at the first platform after being migrated to the second platform.

BACKGROUND OF THE INVENTION

Rights management and enforcement is highly desirable in connection with digital content such as a digital presentation, a digital audio and/or video work, a digital application or the like, where such digital content is to be distributed to one or more users. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user on a computing device thereof, such user can render the content with the aid of an appropriate operating system on the computing device.

Typically, an author and/or publisher of the content wishes to distribute such content to each of many users or recipients in exchange for a license fee or some other consideration. Such author/publisher or other similar entity (hereinafter, "publisher"), given the choice, would likely wish to restrict what each user can do with such published content. For example, the publisher would like to restrict the user from copying and re-distributing such content to a second user, at least in a manner that denies the publisher a license fee from such second user.

However, after publication has occurred, such publisher has very little if any real control over the content. This is especially problematic in view of the fact that practically every personal computer includes the software and hardware necessary to make an exact digital copy of such content, and to download such exact digital copy to a write-able magnetic or optical disk, or to send such exact digital copy over a network such as the Internet to any destination.

Of course, as part of a transaction wherein the content is distributed, the publisher may require the user/recipient of the content to promise not to re-distribute such content in an unwelcome manner. However, such a promise is easily made and easily broken. A publisher may attempt to prevent such re-distribution through any of several known security devices, usually involving encryption and decryption. However, and without more, it can be a relatively simple manner for a mildly determined user to decrypt the encrypted content, save such content in an un-encrypted form, and then re-distribute same.

Rights Management (RM) and enforcement architectures and methods have previously been provided to allow the controlled operation of arbitrary forms of digital content, where such control is flexible and definable by the publisher of such content. Typically, a digital license is provided to operate the content, where the content cannot be actuated in a meaningful manner without such license. For example, it may be the case that at least a portion of the content is encrypted and the license includes a decryption key for decrypting such encrypted portion. In addition, it may be the case that the license is tied to a user, a computing device, an operating system on the computing device, or some combination thereof (hereinafter, 'platform'), and such computing device includes a security feature that ensures that the terms of the license are honored. Notably, by being tied to a particular platform, the license cannot be employed to render the corresponding content on any other platform.

Such a digital license typically includes a set of rights and conditions that govern use of the corresponding content on the computing device. Thus, each license sets forth policies that grant certain rights for specified functionality. With digital licenses, then, a publisher can provide a user with different rights with regard to a piece of content by providing different licenses corresponding to such different rights. For example, the publisher may wish to provide a full-feature license at a higher price and a limited-feature license at a lower price.

In the case where a license is tied to a particular platform, such tying can be achieved by any of several features. As one example, it may be the case that each platform has a corresponding ID, that the license includes a platform ID therein, and that the license is not employed to render the corresponding content on the particular platform unless it is confirmed that the ID of the platform matches the platform ID in the license. As another example, it may be the case that information that must be obtained from the license such as for example a content key for decrypting the corresponding encrypted content is itself encrypted according to a key that is only available from the particular platform. In either example, and again, by being tied to a particular platform, the license cannot be employed to render the corresponding content on any other platform.

As may be appreciated, although one or more licenses may be tied to a particular platform, there may be valid and/or justifiable reasons why a user of such licenses should be able to transfer or 'migrate' same to another platform. As one example, it may be that the platform includes a first computer of a user and the user wishes to migrate the rendering rights incumbent in the licenses from the first computer to a second computer. As another example, it may be that the platform includes a first operating system on a computer of a user and the user wishes to migrate the rendering rights incumbent in the licenses from the first operating system to a second operating system on the computer. In either instance, the publisher that issued each license is presumably not adversely affected by the migrate of such license from one platform to another, and the user who has expended some amount of cost in acquiring each license does not suffer the virtual loss of such license merely because of a change of platform.

However, it is to be appreciated that allowing a license to be migrated from one platform to another must be done in a manner to ensure that a user cannot abuse the ability to migrate such license from a first platform to a second platform. In particular, such user must not be allowed to copy the license to the second platform and perhaps other platforms. That is, the user upon migrating the license from the first platform to the second platform should after such migration have the license tied to the second platform only, and not to the first platform or to any other platform.

Accordingly, a need exists for a method and mechanism by a digital license is migrated from being operable to render a corresponding piece of content on a first computing platform to being operable to render the piece of content on a second computing platform. More particularly, a need exists for a method and mechanism by which the license is un-tied from the first platform and re-tied to the second platform, and for ensuring that the license cannot be employed at the first platform or any other platform after being migrated to the second platform.

SUMMARY OF THE INVENTION

The aforementioned needs are satisfied at least in part by the present invention in which a method is provided with regard to a digital license tied to a source platform, where the digital license allows corresponding digital content to be rendered by the source platform. The content is encrypted and decryptable based on a decryption key (KD), and the license is tied to the source platform by including (KD) therein encrypted and decryptable according to a cryptographic key of the source platform, whereby only the source platform normally can reveal (KD). The method migrates the license from the source platform to a target platform.

At the source platform, a migration image is produced to include the license and corresponding data therein, and the license and the cryptographic key of the source platform are deleted from such source platform. Thus, replacing the deleted license at the source platform would not allow rendering of the corresponding content at the source platform inasmuch as the cryptographic key of the source platform would not be available to access (KD) from such replaced license.

At the target platform, the produced migration image is read and permission is requested from a centralized migration service remote from the target platform to migrate the license in the migration image to the target platform. The migration service determines whether to permit migration of the license based on predetermined migration policy. Upon receiving the requested permission as a response from the migration service, the migration image is applied to the target platform. In particular, the response includes the cryptographic key of the source platform in a form accessible by the target platform, and the target platform un-ties the license from the source platform with the cryptographic key of the source platform to reveal (KD), re-ties the un-tied license to the target platform by including (KD) therein encrypted and decryptable according to a cryptographic key of the target platform, stores the re-tied license at the target platform, and stores the corresponding data at the target platform.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
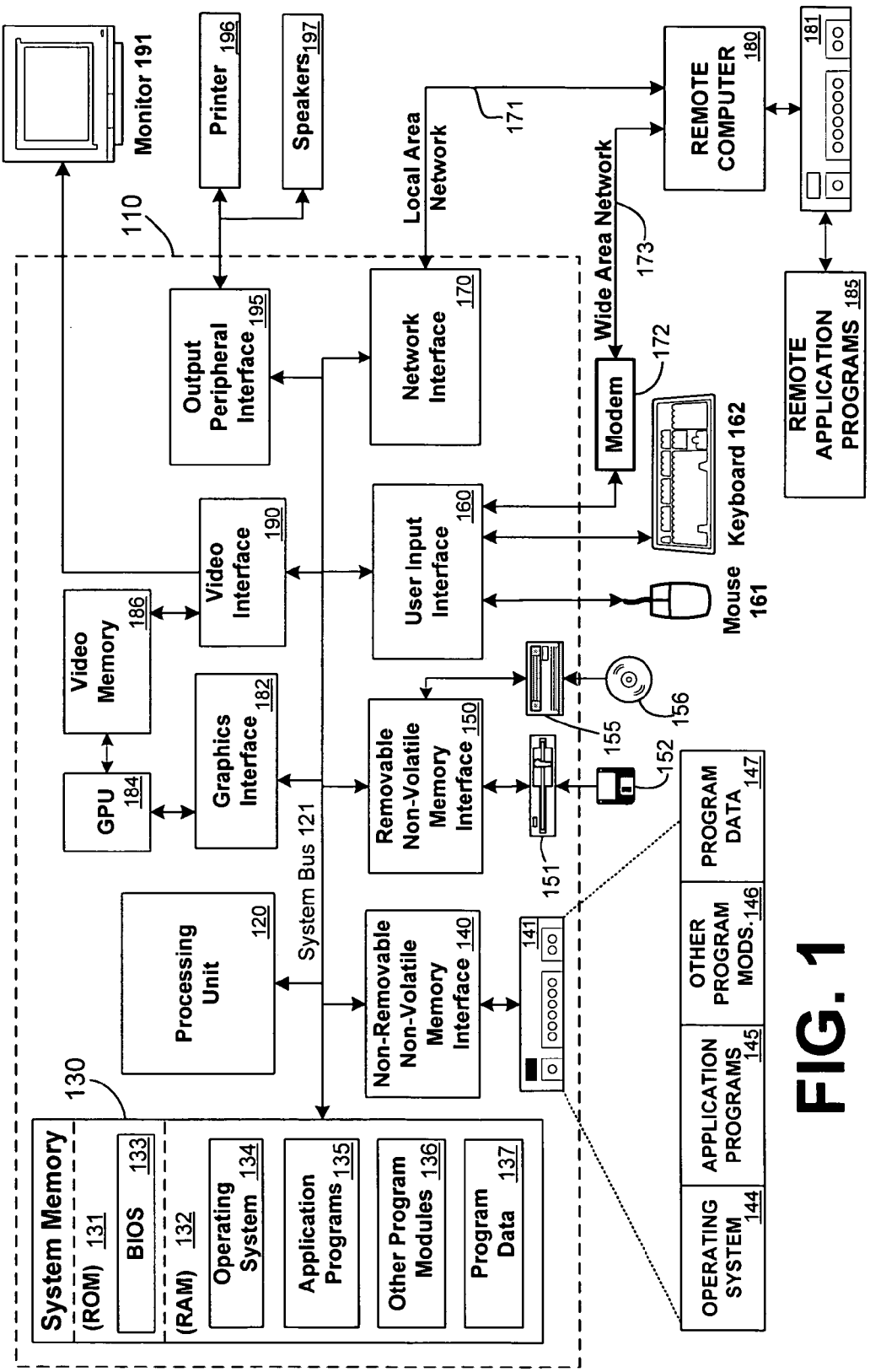
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
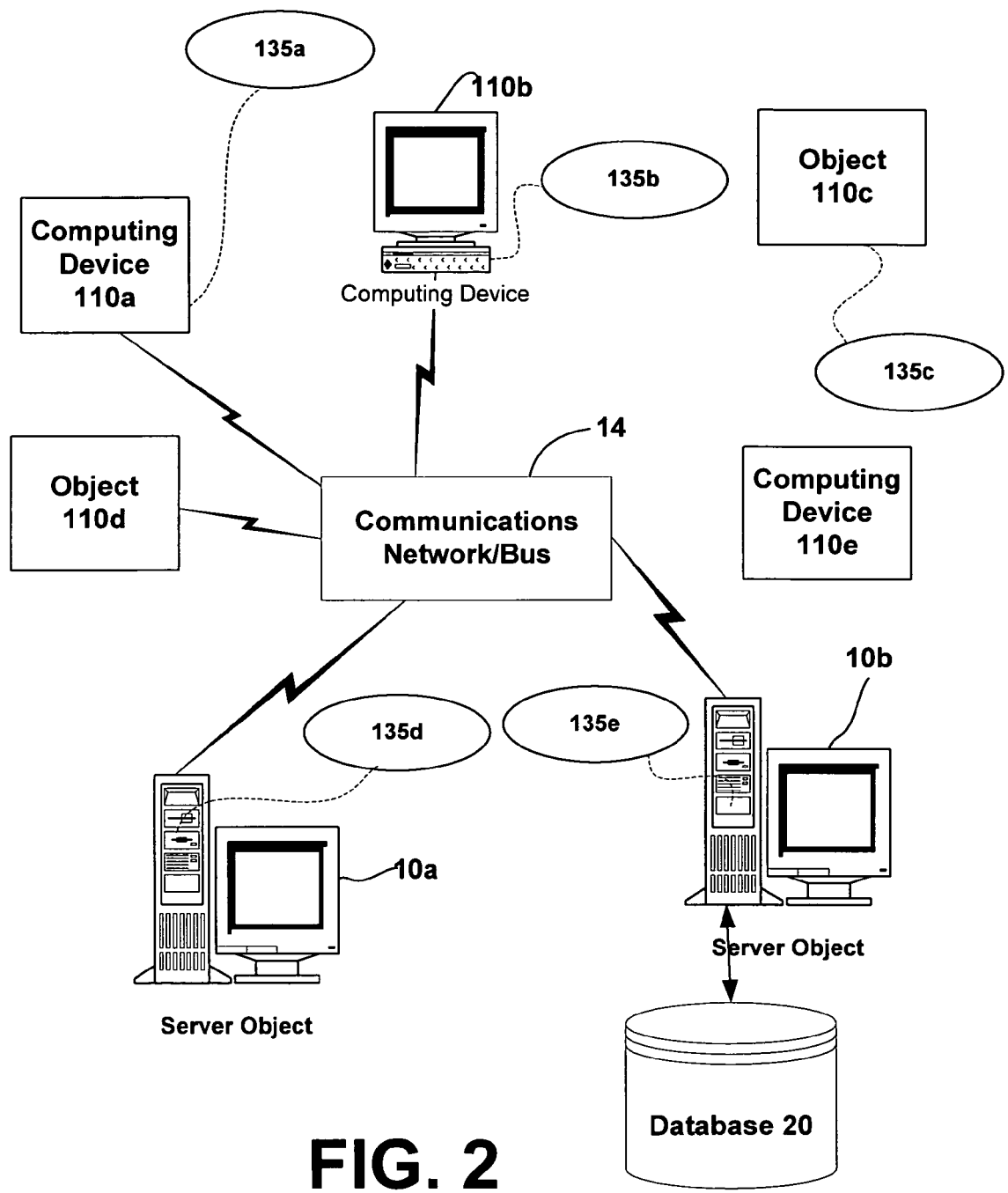
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
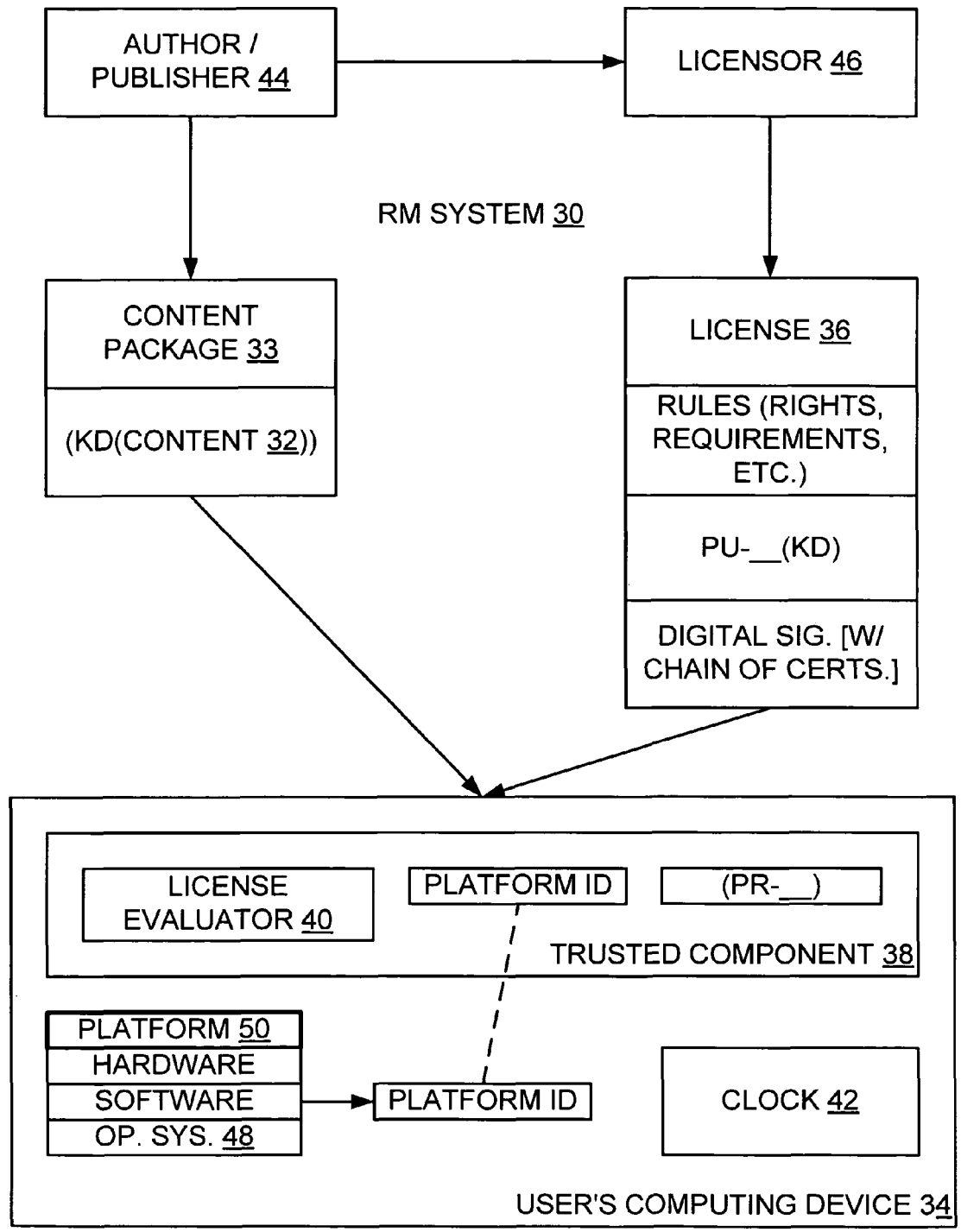
FIG. 3 is a block diagram showing an enforcement architecture of an example of a trust-based system, including a digital license in accordance with one embodiment of the present invention.

As is known, and referring now to FIG. 3, rights management (RM) and enforcement is highly desirable in connection with digital content 32 that is to be distributed to users. Upon being received by the user, such user renders the content 32 with the aid of an appropriate computing device 34 or the like.

Typically, an author or publisher of the content 32 (hereinafter 'publisher 44') distributing such digital content 32 wishes to restrict what the user can do with such distributed content 32. For example, the publisher 44 may wish to restrict the user from copying and re-distributing such content 32 to a second user, or may wish to allow the distributed content 32 to be rendered only a limited number of times, only for a certain total time, only on a certain type of computing device 34, only by a certain type of rendering application on the computing device, only by a certain type of user, etc.

However, after distribution has occurred, such publisher 44 has very little if any control over the content 32. An RM system 30, then, allows the controlled rendering of a piece of content 32, where such control is flexible and definable by the publisher 44 of such content 32. Typically, the content 32 is distributed to the user in the form of a package 33 by way of any appropriate distribution channel. The package 33 as distributed typically includes the content 32 or a portion thereof encrypted with a symmetric encryption/decryption key (KD), (i.e., (KD(content 32))), as well as other information identifying the content 32, how to acquire a license for such content 32, etc.

The trust-based RM system 30 allows the publisher 44 of the content 32 or another to specify rules that must be satisfied before such content 32 is allowed to be rendered on the computing device 34. Such license rules can for example include the aforementioned temporal requirement and/or number of times requirement among other things, and may also set forth rights that the user has with regard to the content 32, such as for example the ability to print or copy and/or the ability to use a particular feature of the content 32, among other things. At any rate, such rules may be embodied within a digital license or use document (hereinafter 'license 36') that the user/user's computing device 34 (such terms being interchangeable unless circumstances require otherwise) must obtain from the publisher 44 or an agent thereof such as a licensor 46. Such license 36 also includes the decryption key (KD) for decrypting the encrypted portion of the content 32, typically encrypted according to a key decryptable by the user's computing device 34. As seen in FIG. 3, such encrypting key may be a public key (PU-____) such as a public key of the user, of the user's computing device 34, of an operating system of the computer device 34, of a security system of the computer device 34, or the like. Presumably, the user's computing device 34 or an element instantiated thereon has access to the corresponding private key (PR-____) by which (PU-____(KD)) may be decrypted.

The publisher 44 for the content 32 must trust that the user's computing device 34 will abide by the rules specified by such publisher 44 in the license 36. That is, such publisher 44 must trust that the content 32 will not be rendered unless the rules within the license 36 are satisfied, and that the user is only permitted to employ the rights set forth in the rules. Preferably, then, the user's computing device 34 is provided with a trusted component or mechanism 38 that will not render the content 32 except according to the license rules embodied in the license 36 associated with the content 32 and obtained by the user.

The trusted component 38 typically has a license evaluator 40 that determines whether the license 36 is valid, reviews the license rules in such valid license 36, and determines based on the reviewed license rules whether the requesting user has the right to render the corresponding content 32 in the manner sought, among other things. As should be understood, the license evaluator 40 is trusted in the RM system 30 to carry out the wishes of the publisher 44 of the content 32 according to the rules in the license 36, and the user should not be able to easily alter such trusted element for any purpose, nefarious or otherwise.

As should be understood, the rules in the license 36 can specify whether the user has rights to render the content 32 based on any of several factors, including who the user is, where the user is located, what type of computing device 34 the user is using, what operating system is calling the RM system 30, the date, the time, etc. In addition, the rules of the license 36 may limit the license 36 to a pre-determined number of renderings, or pre-determined operating time, for example. Thus, the trusted component 38 may need to refer to a clock 42 on the computing device 34.

The rules may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules therein, the content 32 or a relevant portion thereof can then be rendered. In particular, to render the content 32, the trusted component 38 or another entity obtains the private key (PR-_____) from an appropriate location and applies same to (PU-_____ (KD)) from the license 36 to result in the actual decryption key (KD), and applies the decryption key (KD) as obtained from the license 36 to (KD(content 32)) from the package 33 to result in the actual content 32. Such actual content 32 may then in fact be rendered by an appropriate rendering application (not shown) on the computing device 14 in the manner set forth in the license 36.

Tying License 36 to Platform

As set forth above, the license 36 with (PU-_____(KD)) in effect authorizes the trusted component 38 or other entity in possession of (PR-_____) to access (KD) and thereby access the content 32 encrypted according to such (KD), presuming of course that the entity abides by all conditions as set forth in the license 36. As should be appreciated, then, inasmuch as (PR-_____) is a private key and is thus closely tied to and held in secret by an owner thereof, such (PR-_____) in effect ties the license 36 with (PU-_____(KD)) therein to such owner. Put another way, because the license contains (PU-_____(KD)), only the owner of the corresponding (PR-_____) can access the decryption key (KD) from such license 36.

Thus, it may be that the owner of (PR-_____) is the trusted component 38, in which case such trusted component 38 is itself closely tied to the computing device 34 and/or to an operating system 48 instantiated on the computing device 34 and/or to some other element or collection of elements incumbent in the computing device 34. For example, such tying maybe achieved by including within the trusted component 38 a platform ID that can only be derived from the computing device 34 and/or operating system 48 and/or the like, and by requiring that the trusted component 38 be operated only on a platform 50 from which the platform ID can be derived, where the platform 50 represents the collection of elements of the computing device 34 to which the trusted component 38 is tied.

Deriving such a platform ID from the collection of elements representative of the platform 50 of the computing device 34 is known or should be apparent to the relevant public and therefore need not be set forth herein in any detail. For example, it may be the case that the platform ID is derived from a hash of a concatenation of a number of digital IDs obtained from a platform 50 defined to include various elements of the computing device 34, including one or more hardware elements thereof, the operating system 48 thereof, other software elements thereof, and the like. Accordingly, any appropriate derived platform ID may be employed to represent the platform 50 without departing from the spirit and scope of the present invention.

By extension, any appropriate collection of elements of the computing device 34 may be employed to define the platform 50 without departing from the spirit and scope of the present invention. Typically, such collection of elements includes more prominent elements of the computing device 34, including the operating system 48 and the main storage device, be it a hard drive or otherwise.

To summarize then, the license 36 may be tied to the trusted component 38 of the computing device 34 by having therein (PU-_____(KD)), which can only be decrypted by the trusted component 38 as owner of the corresponding (PR-_____)). Likewise, the trusted component 38 may be tied to the platform 50 incumbent in the computing device 34 by having a platform ID therein derivable only from the platform 50. Thus, and to conclude, the license 36 may be tied to such platform 50 by way of such trusted component 38.

Of course, the license 36 may be tied to such platform 50 in any other appropriate manner without departing from the spirit and scope of the present invention. As but one example, the license 36 may be directly tied to the platform 50 by having the platform ID therein (not shown). Likewise, the license 36 may be directly tied to some element of the computing device 34 by having the digital ID of such element of the computing device 34 therein.

Migrating Licenses 36 from First to Second Platform

As was set forth above, a license 36 is typically bound to a particular platform 50, and thus can be employed to render corresponding content 32 only on such particular platform. Accordingly, simply moving the license 36 from a first platform 50 to a second platform 50 would not in and of itself allow corresponding content 32 to be rendered on the second platform 50. Thus, the present invention provides a method and mechanism by which a license 36 is not merely moved but instead is 'migrated' from the first platform 50 to the second platform 50, whereby in the course of migration such license 36 is un-tied from the first platform 50 and re-tied to the second platform 50. In doing so, and as should now be appreciated, the 'migrated' license 36 can be employed to render the corresponding content 32 on the second platform 50.

Significantly, a license 36 should be migrated for a legitimate purpose, such as for example when a user wishes to move the rendering rights incumbent in the license 36 from a first computing device 34 to a second computing device 36, or from a first operating system 48 on the computing device 34 to a second operating system 48 on the computing device 34. In either instance, the publisher 44 that issued the license 36 is presumably not adversely affected by the migration of such license 36, and the user who has expended some amount of cost in acquiring the license 36 does not suffer the virtual loss of such license 36 merely because of a change of platform 50.

In the present invention, predetermined migration policy is employed to determine whether one or more licenses 36 on a first platform 50 can be migrated to a second platform 50. While such policy may of course be any appropriate policy without departing from the spirit and scope of the present invention, it is presumed that such policy represents a balance between the interests of the publisher 44 that issues each license 36 and the user obtaining same. Following are several examples of policy scenarios:

a user is allowed to migrate licenses 36 from a first computing device 34 to a second computing device 34, such as for example when the user has obtained one computer and is discarding another computer;

a user is allowed to migrate licenses 36 from a first operating system 48 on a computing device 34 to a second operating system 48 on the same computing device 34 when the second operating system 48 replaces the first operating system 48;

a user is allowed to migrate licenses 36 from a first operating system 48 on a computing device 34 to a second operating system 48 on the same computing device 34 when the second operating system 48 is in addition to the first operating system 48;

after a user has migrated licenses 36 from a first computing device 34 to a second computing device 34, the user may migrate licenses 36 from a third computing device 34 to the second computing device 34, but only after 12 months has elapsed;

after a user has migrated licenses 36 from a first computing device 34 to a second computing device 34, the user may not migrate licenses 36 from the second computing device 34 back to the first computing device 34; and after a user has migrated licenses 36 from a first computing device 34 to a second computing device 34, the user may migrate licenses 36 from the second computing device 34 back to the first computing device 34, but only if the user specially requests and obtains permission to do so after providing appropriate justification, where the permission is granted only upon an appropriate examination of the justification and other related facts about the user.

Figure 4:
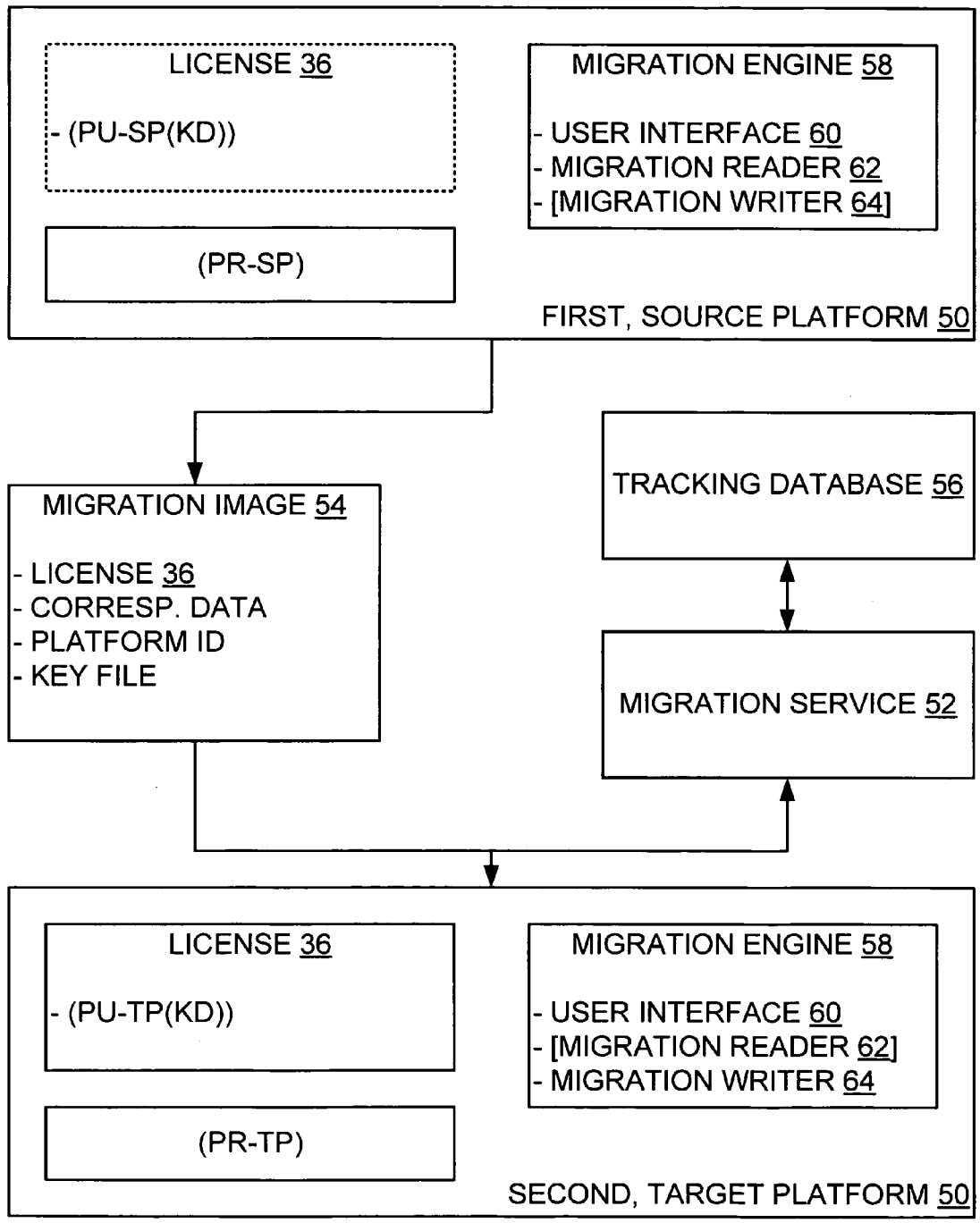
FIG. 4 is a block diagram showing a source platform, a target platform, and a migration service for determining whether to allow a license at the source platform can be migrated to the target platform in accordance with one embodiment of the present invention.

In the present invention, then, and turning now to FIG. 4, a migration service 52 is provided to securely effectuate migrating the license 36 from the first platform 50 to the second platform 50 by un-tying the license 36 from the first platform 50 and re-tying the license 36 to the second platform 50. Likewise, and turning now to FIGS. 5 and 6, the present invention provides a process for establishing trust between the first and second platforms 50 to securely effectuate such migrating and un-tying/re-tying. Significantly, with the present invention, a license 36 that has been migrated is tied to the second platform 50 and can thus only be employed to render corresponding content 32 on the second platform 50. Correspondingly, such license 36 is no longer tied to the first platform 50 and thus cannot be employed to render corresponding content 32 on the first platform 50.

The license 36 is migrated from the first platform 50 to the second platform as part of a signed migration image 54 (FIG. 4). As may be appreciated, such migration may occur by way of a local network connection, a remote network connection, or a transferred storage medium such as a portable storage disk, a portable drive such as a plug-in drive, or other portable medium. The first 'source' platform 50 creates the migration image 54 with the license 36. Such migration image 54 is applied to the second 'target' platform 50 only after the target platform 50 contacts the migration service 52 for approval. The migration service 52 thus maintains a database 56 for tracking migrated licenses 36, and in particular allows such migration to occur only in accordance with predetermined migration policy. Thus, the migration service 52 among other things minimizes perpetration of fraud by any nefarious user that would attempt to copy the license 36 to one or more platforms 50 rather than migrate same from the source platform 50 to the target platform 50.

The present invention is based on establishing trust from the source platform 50 to the target platform 50 by way of the migration service 52 acting as a bridge between such platforms 50. Thus, in the migration process, RM information at the source platform 50 is examined, and if acceptable such RM information is gathered and packaged into the migration image 54, including each license 36 to be migrated and relevant information relating to each license, including state information. At the target platform 50, RM information is likewise examined, and if acceptable the migration image 54 is applied to complete the migration, but only if the migration service 52 authorizes such application. Note that the migration process does not require the source and target platforms to be connected. Also, note that the migration image 54 may be self-signed and can be stored and transmitted in an arbitrary way. Finally, note that although the migration service 52 is contacted by the target platform 50 for authorization to complete the migration, such migration service 52 need not necessarily be contacted by the source platform 50 for authorization to create the migration image 54.

As seen in FIG. 4, in one embodiment of the present invention both the source platform 50 and the target platform 50 have a migration engine 58 for effectuating the migration process. Generally, the migration engine 58 at the source platform 50 performs actions necessary to produce the migration image 54 and the migration engine 58 at the target platform 50 performs actions necessary to consume the produced migration image 54 by writing the licenses 36 and other data therein to an appropriate location. However, it is to be appreciated that such migration engines 58 perform other actions, as will be set forth in more detail below. Thus, the actions performed by the migration engine 58 at the source platform 50 are likely substantially different from the actions performed by the migration engine 58 at the target platform 50. Accordingly, such migration engines 58 may be different from one another. However, such migration engines 58 may also be substantially similar if not identical, as is shown in FIG. 4, for example if it would be more convenient to do so.

Each migration engine 58 may include a user interface 60 to allow a user to access and interact with same. At the source platform 50, then, the interface 60 would provide instructions to a user and gather information therefrom in order to define and collect all data and settings necessary to produce the migration image 54. Likewise, at the target platform 50, the interface 60 would provide instructions to a user and gather any information necessary therefrom in order to consume the produced migration image 54.

The migration engine 58 at the source platform 50 has a migration reader 62. As may be appreciated, such reader 62 is designed to handle specific data collection tasks at the source platform 50, and includes interfaces and other functions that are called by the migration engine 58 in the course of reading the licenses 36 and other data from a store or the like at the source platform 50 to a corresponding migration image 54. Note that such migration image 54 thus represents all information from the source platform 50 necessary to migrate the RM environment at the source platform 50 to the target platform 50. Note, too that such migration image 54 may alternately be employed to recreate the RM environment at the source platform in the event such RM environment for some reason cannot in fact be migrated to the target platform 50.

Similarly, the migration engine 58 at the target platform 50 has a migration writer 64. As may be appreciated here, such writer 62 is designed to handle specific data application tasks at the target platform 50, and includes interfaces and other functions that are called by the migration engine 58 in the course of writing the licenses 36 and other data from the migration image 54 as created at the source platform 50 to a store or the like at the target platform 50. Note that the other data read/written along with the licenses 36 may include all appropriate RM data without departing from the spirit and scope of the present invention, such as for example revocation lists, license state data, hardware ID data, machine ID data, and-the like. Note too that each store may represent a single organized storage area within which all of such data resides or may comprise multiple such storage areas, and also that each storage area may be physical in nature, such as a particular memory device, or conceptual in nature, such as a defined element that may physically exists in several parts on one or more particular memory devices.

Figure 5:
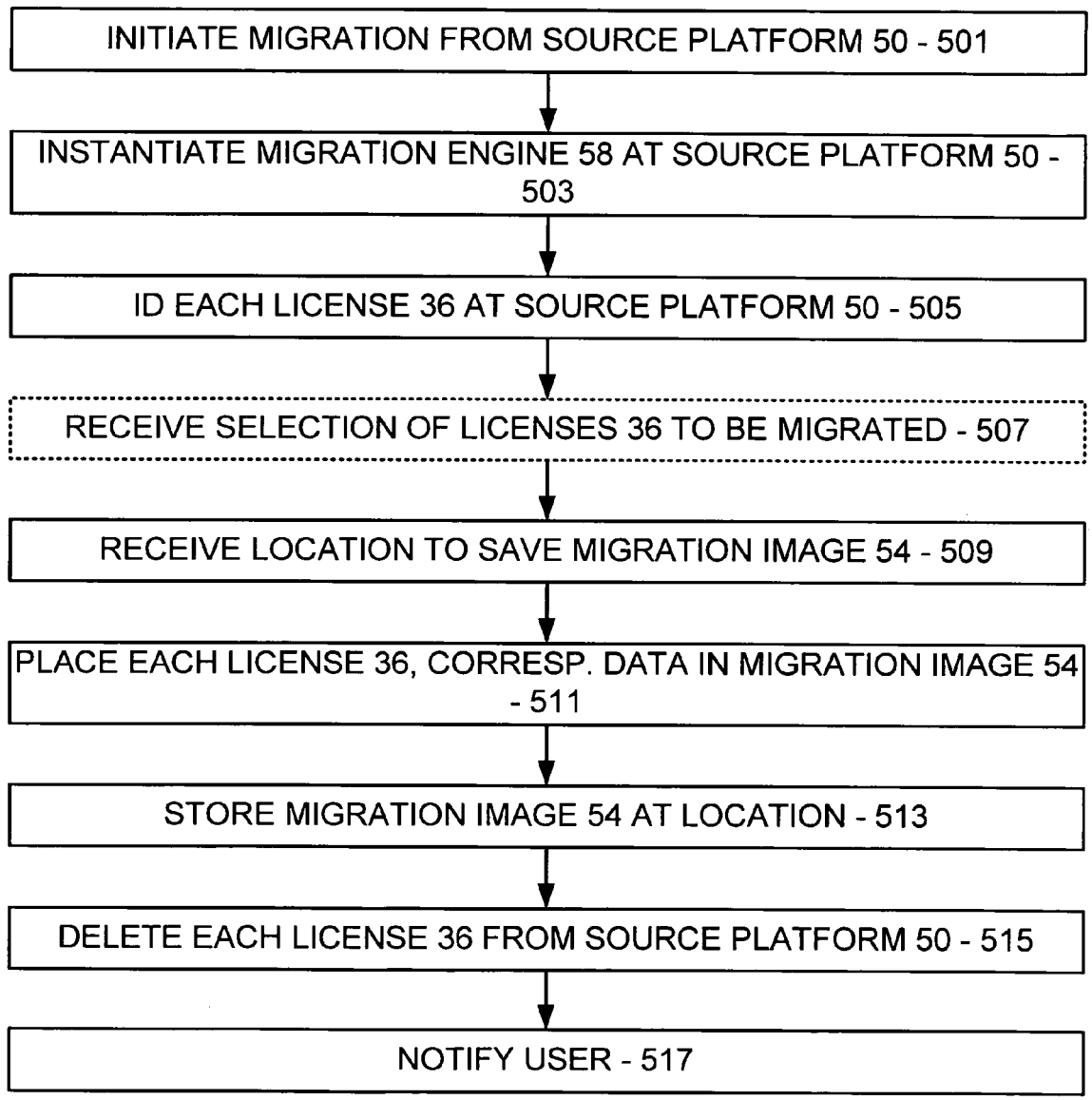
FIG. 5 is a flow diagram showing key steps performed at the source platform of FIG. 4 in creating a migration image with the license in accordance with one embodiment of the present invention.
Figure 6:
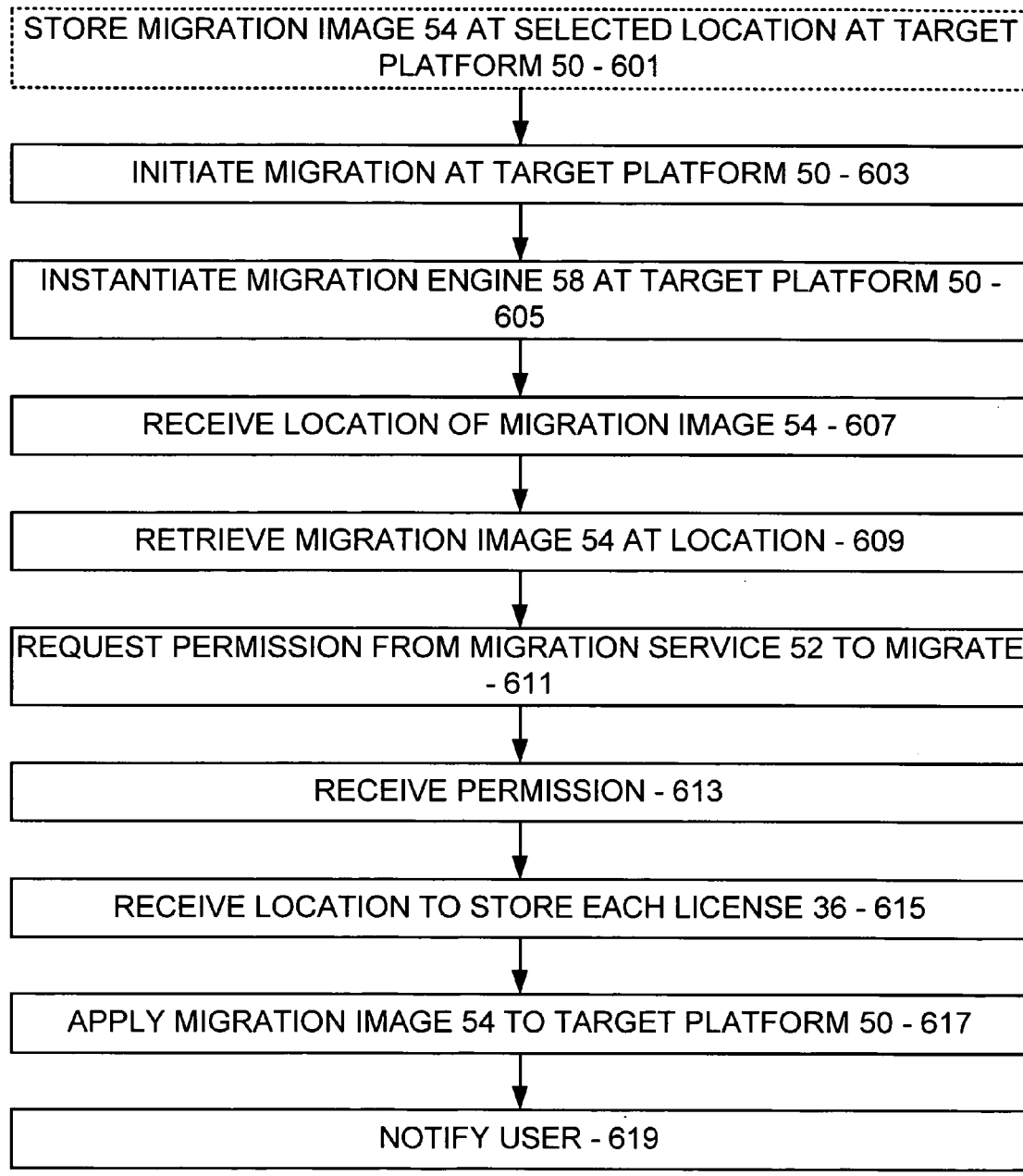
FIG. 6 is a flow diagram showing key steps performed at the target platform of FIG. 4 in consuming the migration image with the license in accordance with one embodiment of the present invention.

Referring particularly to FIGS. 5 and 6, now, and in one embodiment of the present invention, a method for migrating one or more licenses 36 from a source platform 50 to a target platform 50 is shown. As may be appreciated, FIG. 5 shows a first part of the method the end result of which is the production of the migration image 54, and FIG. 6 shows a second part of the method the end result of which is the consumption of the migration image 54 to in fact result in the licenses 36 being migrated from the source platform 50 to the target platform 50.

Preliminarily, and as seen in FIG. 5, migration from the source platform 50 and creation of the migration image 54 is initiated at the command of a user or the like at such source platform 50 (step 501), after which the migration engine 58 is instantiated at such source platform 50 (step 503). Particularly in the case where the migration engine 58 may be employed both at the source platform 50 and the target platform 50, instantiation at the source platform 50 as at step 503 may include the user identifying or being prompted to identify that the migration engine 58 is to be employed at the source platform 50. Once identified as being employed at the source platform 50, then, the migration engine 58 proceeds by identifying the licenses 36 at the source platform 50.

In particular, the migration engine 58 by way of the migration reader 62 thereof locates the trusted component 38 at the source platform 50 and queries the located trusted component 38 for an identification of each license 36 at the source platform 50 (step 505). Such a query is known or should be apparent to the relevant public and may be performed in any appropriate manner without departing from the spirit and scope of the present invention. For example, the trusted component 38 may include a function that allows same to discover each license 36, including an identification and location thereof, and the migration reader 62 of the migration engine 58 may either call such function directly or indirectly by way of such trusted component 38.

At any rate, upon receiving the identification of each license 36 at the source platform 50, the migration engine 58 may present each such identified license 36 to the user by way of the user interface 50 and receive from such user by way of such user interface 60 a selection of the identified licenses 36 to be migrated (step 507). Alternatively, the migration engine 58 may require that the user migrate all such identified licenses 36, in which case the selecting as at step 507 may be omitted. Note that user selection of licenses 36 to be migrated from the source platform 50 may be omitted to simplify matters, and especially to simplify tracking migration within the tracking database 56. In particular, if selecting is allowed, the database 56 likely must track each license 36 at the source platform 50. In contrast, if selecting is not allowed, the database 56 likely need only track the source platform 50 itself.

Upon identification and perhaps selection of each license 36 at the source platform 50 to be migrated, then, the migration engine 58 may prompt the user by way of the user interface 60 to select a location to save the migration image 54 to be produced based on the licenses 36 to be migrated, and the migration engine 58 may then receive such save location (step 509). As may be appreciated, such location may be a portable medium, a local medium at the source platform 50, a remote medium away from the source platform 50, or the like. Depending on the medium chosen, then, the user may intend to physically carry the migration image 54 to the target platform 50, electronically transmit the migration image 54 to the target platform 50 by way of an appropriate communications medium, or electronically retrieve the migration image 54 at the target platform 50.

At any rate, the migration engine 58 proceeds by producing the migration image 54 based on the licenses 36 to be included therewith and stores the produced migration image 54 at the selected location. In particular, the migration reader 62 of the migration engine 58 either directly or indirectly by way of the trusted component 38 gathers each license 36 to be included as well as corresponding data and places the license 36 and the corresponding data in the migration image 54 (step 511). Note that in doing so, the migration engine 58 may either create the migration image 54 at the selected location or at a temporary location, and if at the temporary location the migration image 54 would upon completion store the created migration image 54 at the selected location (step 513). In either case, upon the migration image 54 being created and stored at the selected location, the migration engine 58 may by way of the interface 60 thereof notify the user that the migration image 54 has indeed been created and stored at the selected location (step 517), after which the migration engine 58 can be terminated.

The corresponding data that the migration reader 62 places in the migration image 54 may include data specific to each license 36 in the migration image 54, and also data specific to the source platform 50, and may be any appropriate data without departing from the spirit and scope of the present invention. In one embodiment of the present invention, such corresponding data in the migration image 54 includes for each license 36 and all state information relating to the license 36 as maintained in an appropriate state store or the like. In addition, such corresponding data in the migration image 54 includes for the source platform 50 a platform ID thereof or the like, hardware information relating to such source platform 50, software information relating to such source platform 50, operating system information relating to the operating system 48 of the source platform 50, and the like.

Notably, the corresponding data in the migration image 54 should also include cryptographic keys necessary to un-tie each license 36 from the source platform 50 so that the license 36 may be re-tied to the target platform 50, perhaps in the form of a key file or the like. As will be set forth in more detail below, such un-tying and re-tying is performed by the migration engine 58 at the target platform 50 upon receiving permission to do so from the migration service 52. The cryptographic keys in the migration image 54 should be encrypted in a manner decryptable by the migration service 52, or by an entity on behalf of the migration service 52. For example, the cryptographic keys in the migration image 54 may be encrypted to be decryptable by a centralized service, such as for example a backup and restore service that would be required to in fact decrypt such encrypted cryptographic keys, and the migration service 52 may be in contact with such backup and restore service or the like to employ the services thereof to in fact decrypt the encrypted cryptographic keys at an appropriate time. Encrypting the cryptographic keys to be decryptable by any particular service is known or should be apparent to the relevant public and therefore need not be set forth herein in any particular detail. Such cryptographic keys may of course be encrypted to be decryptable by or on behalf of the migration service 52 in any appropriate manner without departing from the spirit and scope of the present invention.

Note that the migration engine 58 may create the migration image 54 in any particular form without departing from the spirit and scope of the present invention. For example, the migration image 54 may be created as a folder containing each license 36 as a file and perhaps the corresponding data for all of the contained licenses 36 as another file, or as a hierarchical tree structure containing each license 36 and the corresponding data as nodes at appropriate locations within such tree structure.

Note, too, that the created migration image 54 may include a digital signature or a hash based on such image 54 or a portion thereof. As may be appreciated, such signature or hash may be employed by the target platform 50 and/or the migration service 52 for purposes of verifying that the migration image 54 has not been altered. Such signature or hash may also at least implicitly act as an assertion from the migration engine 58 at the source platform 50 that the migration image 54 was properly created as part of a migration of licenses 36 from such source platform 50.

Note also that it is highly advisable if not mandatory to encrypt at least some parts of the migration image 54 to avoid browsing thereof by an improper entity. In particular, and as was set forth above, inasmuch as the migration image 54 likely includes one or more cryptographic keys that the target platform 50 is to employ to un-tie each license 36 therein from the source platform 50, such keys should be encrypted in a form such that only the target platform 50 can access same, and only after the migration service 52 has provided permission to do so. Of course, other portions of the migration image 54 may also be encrypted without departing from the spirit and scope of the present invention.

In one embodiment of the present invention, and as may be appreciated, as part of performing the tasks of FIG. 5, the migration engine 58 at the source platform 50 upon successfully creating the migration image 54 with the licenses 36 from the source platform 50 must delete such licenses 36 from the license store or the like of the source platform 50 (step 515). Note, though, that a nefarious entity may wish to avoid losing such licenses 36 at the source platform 50 by copying such licenses 36 from the license store and replacing such licenses 36 in the license store after the migration engine 58 has deleted same. To counter such a threat, and in one embodiment of the present invention, the migration engine 58 also in effect resets the trusted component 38 at the source platform 50 by deleting the keys thereof and providing replacement keys therefor. Thus, even if a nefarious entity did attempt to replace the deleted licenses 36, the trusted component 38 would have no way of accessing the decryption keys therein.

Thereafter, and referring now to FIG. 6, the user may cause the created migration image 54 to be transported in an appropriate manner from the selected location at the source platform 50 and stored at a selected location at the target platform 50 (step 601). In particular, and depending on the type of selected location at the source platform 50, and as was set forth above, the user may physically carry the migration image 54 to the target platform 50, electronically transmit the migration image 54 to the target platform 50 by way of an appropriate communications medium, or electronically retrieve the migration image 54 at the target platform 50. In any case, once at the target platform 50, the migration image 54 is appropriately stored at the selected location at such target platform 50 in an appropriate manner.

Note that in at least some instances, the selected location at the source platform 50 and the selected location at the target platform 50 may be one and the same. This is particularly true in the case where the platforms 50 are on the same computing device 34, such as for example when an operating system 48 on the computing device 34 is upgraded to a newer version. This is also true in the special case where as set forth in more detail below the migration is not permitted by the migration service 52, after which the user may move the licenses 36 from the migration image 54 back to the source platform 50, which would in effect be the target platform 50. If indeed the selected location at the source platform 50 and the selected location at the target platform 50 are one and the same, transporting as at step 601 may of course be omitted.

At any rate, retrieval of each license 36 and corresponding data from the migration image 54 at the target platform 50 is initiated at the command of a user or the like at such target platform 50 (step 603), after which the migration engine 58 is instantiated at such target platform 50 (step 605). Particularly in the case where the migration engine 58 may be employed both at the source platform 50 and the target platform 50, and similar to that which was set forth above, instantiation at the target platform 50 as at step 605 may include the user identifying or being prompted to identify that the migration engine 58 is to be employed at the target platform 50. Once identified as being employed at the target platform 50, then, the migration engine 58 proceeds by identifying the migration image 54 at the target platform 50.

In particular, and as before, the migration engine 58 may prompt the user by way of the user interface 60 thereof to identify the selected location at which the migration image 54 is stored at the target platform 50, and the migration engine 58 may then receive such selected location (step 607). Thereafter, the migration engine 58 forwards the selected location to the migration writer 64 thereof, and the migration writer 64 reads the migration image 54 as stored at the selected location (step 609).

Notably, the migration writer 64 upon reading the migration image 54 requests permission from the migration service 52 to in fact proceed by writing the licenses 36 in the migration image 54 to the target platform 50 (step 611). Although such request may include any appropriate information without departing from the spirit and scope of the present invention, it is envisioned that such request should at a minimum include a platform ID of the target platform 50 and a platform ID of the source platform 50 as obtained from the migration image 54, and perhaps more details on the operating system 48, software, and/or hardware at each of the source platform 50 and target platform 50 as may be necessary.

As should be appreciated, then, the migration service 52 determines whether to approve the request based on predetermined policy, notes appropriate information regarding the request and the corresponding migration in the database 56, and returns an appropriate response to the requesting migration writer 64. As was set forth above, such policy involves a consideration of specific details regarding the source platform 50 and the target platform 50, including for example for each platform 50 the platform ID thereof as well as details regarding the hardware, software, and/or operating system 48. Again, such policy may be any appropriate policy without departing from the spirit and scope of the present invention, but should represent a balance between the interests of the publisher 44 that issues each license 36 and the user.

The information regarding the request and the corresponding migration in the database 56 as noted in the database 56 may be any appropriate information without departing from the spirit and scope of the present invention. Presumably, such information is of a type such that fraud detection can occur. In particular, such information should include any data that may be necessary for a policy decision should a future request to migrate be received by the migration service 52 regarding the source platform 50 and/or the target platform 50. As one example, if the request is permitted and policy requires that the target platform 50 be allowed only a single migration, then the information regarding the request as noted in the database 56 should be to the effect that the source platform 50 has already in fact been employed as a source platform 50. Thus, a future request for migration should not be permitted if the request identifies the source platform 50 as source platform 50.

Hopefully, the response is positive, in which case the migration is permitted. However, such response may also be negative, in which case the migration is not permitted. In the latter case, and as was alluded to above, the user likely would wish to move the licenses 36 from the migration image 54 back to the source platform 50, which would in effect be the target platform 50. If so, the user would then perform the steps of FIG. 6 at the source platform 50 as the target platform 50.

Presuming now that the migration writer receives a response that the request is indeed permitted by the migration service 52 (step 613), the migration writer 64 proceeds by locating the trusted component 38 at the target platform 50 and querying the located trusted component 38 for an identification of where to store each license 36 at the target platform 50 (step 615). Similar to before, such a query is known or should be apparent to the relevant public and may be performed in any appropriate manner without departing from the spirit and scope of the present invention. For example, the trusted component 38 may include a function that allows same to identify a license store for storing each license 36, and the migration writer 64 of the migration engine 58 may either call such function directly or indirectly by way of such trusted component 38.

At any rate, upon receiving the identification of a license store or the like for storing each license 36 at the target platform 50, the migration writer 64 applies the migration image 54 to such target platform 50 (step 617). In particular, the migration writer 64 either directly or indirectly by way of the trusted component 38 retrieves each license 36 and the corresponding data in the migration image 54, un-ties the license 36 from the source platform 60 and re-ties the license to the target platform 50, stores the license 36 in the identified license store at the target platform 50, and stores the corresponding data in an appropriate location. Upon the migration image 54 being applied, then, the migration engine 58 may by way of the interface 60 thereof notify the user that the migration image 54 has indeed been applied to the target platform 50 (step 619), after which the migration engine 58 can be terminated.

The migration writer 64 may un-tie the license 36 from the source platform 60 and re-tie the license 36 to the target platform 50 in any appropriate manner without departing from the spirit and scope of the present invention. For example, in one embodiment of the present invention, the migration writer 64 does so in the following manner. Preliminarily, and remembering that the migration image 54 includes cryptographic keys necessary to un-tie each license 36 from the source platform 50 in the form of a key file or the like, and also remembering that the cryptographic keys in the key file are encrypted in a manner decryptable by or on behalf of the migration service 52, the migration writer 64 in requesting permission from the migration service 52 as at step 611 includes with the request the key file from the migration image 54. Thus, upon the migration service 52 approving the request, such migration service 52 decrypts the cryptographic keys in such key file as appropriate, and includes such cryptographic keys with the positive response to the request as at step 613.

Note, though, that such cryptographic keys should not be provided in the response in an un-encrypted form, but instead should be encrypted in a form decryptable by the migration writer 64. Accordingly, in one embodiment of the present invention, the migration writer 64 and the migration service 52 cooperatively establish a shared secret during the course of the request such as a symmetric key that may be employed both by the migration service 52 to encrypt the cryptographic keys and by the migration writer 64 to decrypt such keys. In another embodiment of the present invention, the migration writer 64 in requesting permission from the migration service 52 as at step 611 includes with the request a public key thereof (PU-MW), the migration service 52 encrypts the cryptographic keys with (PU-MW) to result in (PU-MW(cryptographic keys)), and the migration writer 64 decrypts such cryptographic keys by apply a corresponding private key (PR-MW) to (PU-MW(cryptographic keys)) to reveal same.

As was pointed out above, each license 36 is tied to a particular platform 50 by having the decryption key (KD) therein encrypted according to a public key of the platform 50 (PU-_____) to result in (PU-_____(KD)). Thus, only the platform 50 with the corresponding private key (PR-_____) can apply same to (PU-_____(KD)) to reveal (KD). For each license 36, then, the cryptographic key provided by the migration service 52 to un-tie the license 36 from the source platform 50 is a private key of such source platform 50 (PR-SP) that corresponds to a public key of such source platform 50 (PU-SP) that encrypts the decryption key (KD) within the license 36 to result in (PU-SP(KD)). Note that while such a private key (PR-SP) normally would be closely held as a secret by the source platform 50, such (PR-SP) is likely the private key of the trusted component 38, which was reset for the trusted component 38 as part of the migration, as was set forth above. Accordingly, such (PR-SP) need not be as closely held. At any rate, the migration engine 58 at the target platform 50 (as well as at the source platform 50) is in all likelihood a trusted entity and therefore is trusted to properly handle such (PR-SP).

That said, and as may now be appreciated, for the migration writer 64 at the target platform 50 to un-tie each license 36 from the source platform 50, such migration writer 64 retrieves (PU-SP(KD)) from the license 36, retrieves (PR-SP) as provided by the migration service 52 in the response to the request to migrate as at step 613, and applies (PR-SP) to (PU-SP(KD)) to reveal (KD). Thereafter, the migration writer 64 at the target platform 50 re-ties the license 36 to the target platform 50, by retrieving a public key thereof (PU-TP), applying such (PU-TP) to (KD) to produce (PU-TP(KD)), and placing such (PU-TP(KD)) into the license 36. Thus, only the target platform 50 with a corresponding private key (PR-TP) may apply same to (PU-TP(KD)) to reveal (KD). Note that by altering the license 36, any digital signature thereof likely will fail to validate. Accordingly, appropriate provision is made for the migration writer 64 to re-sign the license 36 to produce a new digital signature that will indeed validate, and also appropriate provision is made for the trusted component 38 to refer to the new digital signature when validating the license 36. Such re-signing and related functions are known or should be apparent to the relevant public and therefore need not be set forth herein in any particular detail. Such re-signing and related functions may therefore be performed in any appropriate manner without departing from the spirit and scope of the present invention.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided to migrate a digital license 36 from being operable to render a corresponding piece of content 32 on a first computing platform 50 to being operable to render the piece of content 32 on a second computing platform 50. The license 36 is un-tied from the first platform 50 and re-tied to the second platform 50, and the license 36 cannot be employed at the first platform 50 or any other platform 50 after being migrated to the second platform 50.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for receiving, by a migration engine at a target platform, a digital license from a migration engine associated with a source platform, the method comprising:

receiving, by the target platform, from the migration engine associated with the source platform, a migration image comprising a device identifier of the source platform, a digital license, and license data, said license data further comprising one or more source platform public key encrypted application decryption keys, and a key file comprising a migration service key encrypted private key of the source platform;

sending, by the target platform, a request to the migration service, the request comprising a device identifier of the source platform, a device identifier of the target platform, and the key file;

receiving, by the target platform, a response from the migration service, the response comprising the private key from the migration service key encrypted private key; and accessing, by the target platform, the one or more application decryption keys by decrypting the license data using the private key of the source platform.

2. The method of claim 1 further comprising:

receiving at the target platform with the migration image, information showing that the digital license and a private key (PR-SP) were deleted from the source platform such that replacing the deleted license at the source platform would not allow rendering of the protected digital content at the source platform inasmuch as the private key (PR-SP) would not be available to access (KD) from such replaced license;

applying the migration image to the target platform based on the response by tying the un-tied license to the target platform by including (KD) therein encrypted and decryptable according to a public key of the target platform (PU-TP) to result in (PU-TP(KD)), only the target platform with a corresponding private key (PR-TP) normally applying same to (PU-TP(KD)) to reveal (KD), and storing the re-tied license at the target platform.

3. The method of claim 1 wherein the migration image comprises information showing that the source platform migration engine had been instantiated at the source platform.

4. The method of claim 1 further comprising instantiating the migration engine at the target platform, the migration engine at the target platform for applying the migration image at the target platform.

5. The method of claim 1 wherein the migration image comprises information showing that a user at the source platform had selected the license to be migrated to the target platform.

6. The method of claim 1 wherein receiving migration image comprises data specific to the license, the data specific to the license including data specific to the source platform, state information relating to the license as maintained in a state store at the source platform, the platform identification of the source platform and platform information regarding the source platform and identifying particular hardware, software and/or operating system features of the source platform.

7. The method of claim 6 comprising requesting permission from the centralized migration service to migrate the license, the request having request data including a platform ID identifying the target platform, the platform identification of the source platform as obtained from the migration image, platform information regarding the target platform and identifying particular hardware, software and/or operating system features of the target platform, and at least a portion of the platform information regarding the source platform as obtained from the migration image, and receiving as a response to the request a determination from the centralized migration service to permit migration of the license based on predetermined migration policy that takes into account such request data.

8. The method of claim 1 wherein the migration image received at the target platform includes at least one of a digital signature and a hash based on at least a portion of the migration image such that the centralized migration service may employ such signature or hash to verify that the migration image has not been altered.

9. The method of claim 1 wherein the migration image comprises information showing that the migration image had been saved to a selected location at the source platform, receiving the migration image from the selected location at the source platform to a selected location at the target platform, and retrieving the migration image from the selected location at the target platform.

10. The method of claim 2 further comprising the target platform resigning the re-tied license.

11. A computer-readable storage medium comprising computer readable instructions that when executed by a processor cause the processor to perform the steps of receiving, by the target platform, from the migration engine associated with the source platform, a migration image comprising a device identifier of the source platform, a digital license, and license data, said license data further comprising one or more source platform public key encrypted application decryption keys, and a key file comprising a migration service key encrypted private key of the source platform;

sending, by the target platform, a request to the migration service, the request comprising a device identifier of the source platform, a device identifier of the target platform, and the key file;

receiving, by the target platform, a response from the migration service, the response comprising the private key from the migration service key encrypted private key; and accessing, by the target platform, the one or more application decryption keys by decrypting the license data using the private key of the source platform.

12. The medium of claim 11 further comprising instructions for:

receiving at the target platform with the migration image, information showing that the digital license and a private key (PR-SP) were deleted from the source platform such that replacing the deleted license at the source platform would not allow rendering of the protected digital content at the source platform inasmuch as the private key (PR-SP) would not be available to access (KD) from such replaced license;

applying the migration image to the target platform based on the response by tying the un-tied license to the target platform by including (KD) therein encrypted and decryptable according to a public key of the target platform (PU-TP) to result in (PU-TP(KD)), only the target platform with a corresponding private key (PR-TP) normally applying same to (PU-TP(KD)) to reveal (KD), and storing the re-tied license at the target platform.

13. The medium of claim 11 wherein the migration image comprises information showing that the migration image was produced by the migration engine associated with the source platform to include the license and data specific to the license, the data specific to the license including data specific to the source platform, state information relating to the license as maintained in a state store at the source platform, the platform identification of the source platform and platform information regarding the source platform and identifying particular hardware, software and/or operating system features of the source platform.

14. The medium of claim 11 the request to the migration service comprises request data including a platform ID identifying the target platform, the platform ID of the source platform as obtained from the migration image, platform information regarding the target platform and identifying particular hardware, software and/or operating system features of the target platform, and at least a portion of the platform information regarding the source platform as obtained from the migration image, and receiving as a response to the request a determination from the centralized migration service to permit migration of the license based on predetermined migration policy that takes into account such request data.

15. The medium of claim 11 wherein the migration image received at the target platform includes the license and the cryptographic key of the source platform encrypted and decryptable by the migration service.

16. The medium of claim 15 wherein the to the migration service comprises request data including the encrypted cryptographic key of the source platform, and receiving the requested permission as a response from the centralized migration service, the response including the cryptographic key of the source platform encrypted and decryptable by the target platform.

17. The medium of claim 11 wherein the migration image received at the target platform includes at least one of a digital signature and a hash based on at least a portion of the migration image, such that the centralized migration service may employ such signature or hash to verify that the migration image has not been altered.

18. The medium of claim 11 wherein receiving the migration image further comprises receiving data sufficient to indicate that the migration image had been saved to a selected location at the source platform, and receiving the migration image from the selected location at the source platform to a selected location at the target platform, and retrieving the migration image from the selected location at the target platform.

* * * * *

UNITED STATES PATENT AND TRADEMARK OFFICE
CERTIFICATE OF CORRECTION

| | |
|---|---|
| PATENT NO. | : 7,805,375 B2 |
| APPLICATION NO. | : 11/316509 |
| DATED | : September 28, 2010 |
| INVENTOR(S) | : Christopher J. Fox et al. |

It is certified that error appears in the above-identified patent and that said Letters Patent is hereby corrected as shown below:

In column 24, line 9, in Claim 16, after "wherein" delete "the".

Signed and Sealed this
Fifteenth Day of February, 2011

David J. Kappos
*Director of the United States Patent and Trademark Office*